UNITED STATES PATENT OFFICE.

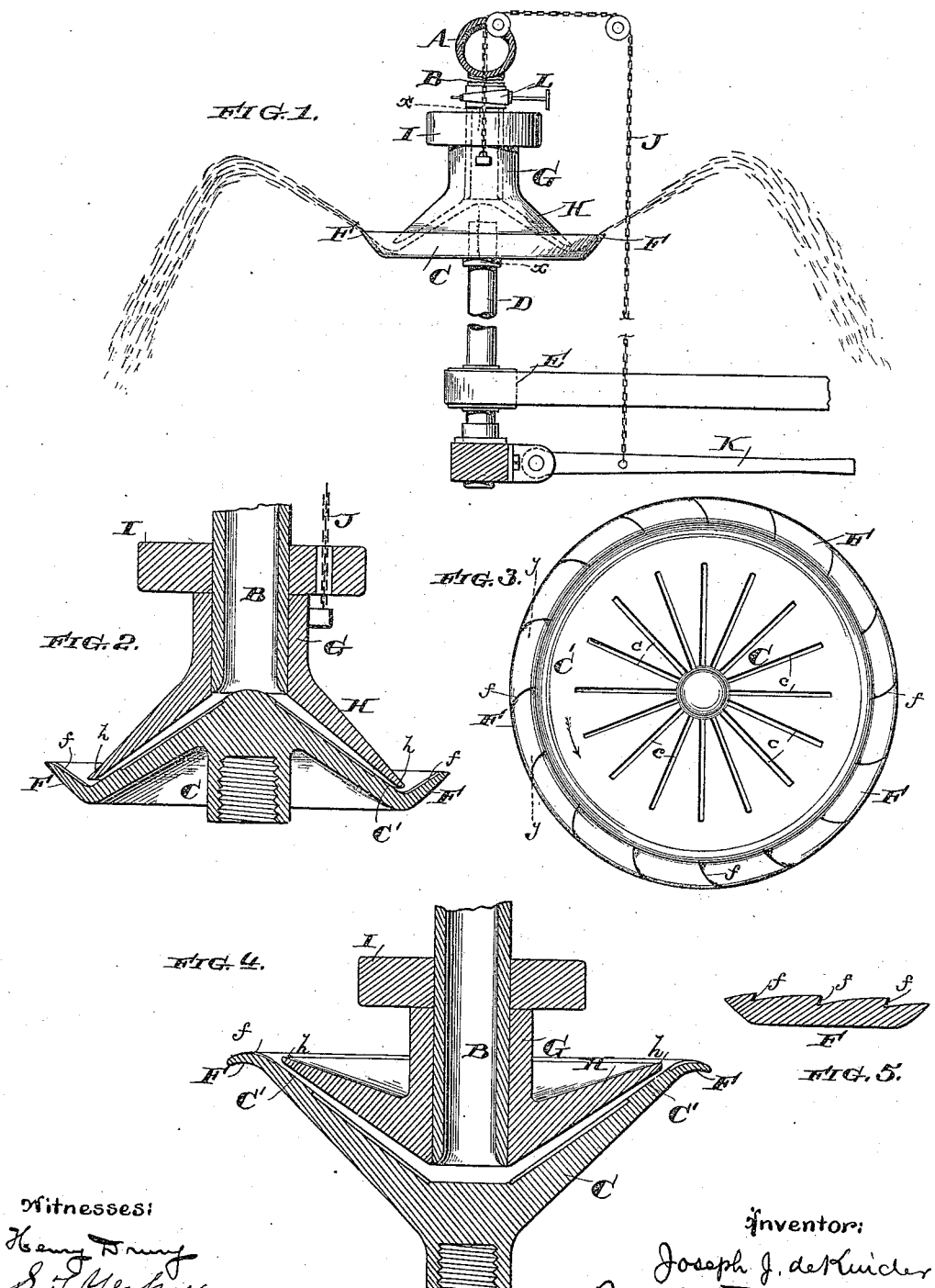

JOSEPH J. DE KINDER, OF PHILADELPHIA, PENNSYLVANIA.

APPARATUS FOR SPRINKLING AND COOLING LIQUIDS.

SPECIFICATION forming part of Letters Patent No. 442,865, dated December 16, 1890.

Application filed August 21, 1890. Serial No. 362,585. (No model.)

*To all whom it may concern:*

Be it known that I, JOSEPH J. DE KINDER, of the city and county of Philadelphia and State of Pennsylvania, have invented an Improvement in Apparatus for Sprinkling and Cooling Liquids, of which the following is a specification.

My invention relates to apparatus for sprinkling and cooling liquids; and it consists of certain improvements which are fully set forth in the following specification and shown in the accompanying drawings, which form a part thereof.

In many manufactures it is necessary to cool or reduce the temperature of highly-heated liquids, either because in subsequent manipulations they must be treated in a cool state and too great time would be consumed in allowing them to cool slowly, or because the cooling process is one of the necessary steps in the process of manufacture. Particularly in the brewing of malt liquors it is necessary that the heated liquids should be cooled, and it is especially necessary that this cooling process should be performed with rapidity.

My invention has for its object the cooling of these highly-heated liquors with the proper rapidity and completeness, and while it is particularly adapted to use in the process of brewing malt liquors it is not necessarily limited thereto, but may be used in any process in which a rapid and effective cooling of hot liquids is required.

In carrying out my invention I cause the liquid to be cooled to be fed upon a rapidly-rotating disk or frame, from which it is thrown out by the action of centrifugal force in a fine spray falling upon the receptacle placed in position to receive it. The passage of the liquid through the air in an atomized or finely-divided condition causes it to become cooled with great rapidity, so that by the time it reaches the receptacle it has been materially reduced in temperature. I also employ devices for controlling the amount of the liquid which is allowed to flow out upon the rotating disk or frame and thus to regulate the depth of the liquid upon it.

My invention also relates to certain peculiarities in the construction of the rotary disk, whereby the spraying or atomizing of the liquid is more perfectly accomplished, and to certain novel combinations and arrangements of parts, which are more fully set forth hereinafter and claimed.

In the drawings, Figure 1 is a side elevation of my improved apparatus for cooling liquors. Fig. 2 is a vertical sectional view of the same through the line $x\,x$ of Fig. 1, on an enlarged scale. Fig. 3 is a plan view of the rotary disk. Fig. 4 is a similar view to Fig. 2, illustrating a modification of my invention; and Fig. 5 is a sectional view of the rotary disk on the line $y\,y$ of Fig. 3.

A is the liquor-main, from which the supply-pipe B leads to conduct the liquor therefrom to the sprinkling or atomizing devices.

C is a rotary disk or frame arranged immediately below the liquor-outlet from the pipe B. This disk C is carried by a rod D, to which a rapid rotary motion is imparted by a band E, or in any other convenient and well-known manner. The disk C is preferably formed with an inclined surface terminating in a flaring lip or ledge F. The angle or inclination of this lip or ledge F with the surface of the disk regulates the angle at which the liquor is thrown by centrifugal force from the disk, and may be varied as desired.

G is a collar fitting upon the supply-pipe B, and having a disk-like extension H, which extends out over the surface of the rotary disk C, and has its under face inclined to correspond to the inclination of the surface of the disk C.

In the construction shown in Fig. 2 the disk C is formed cone-shaped and the disk H like an inverted funnel, while in the construction shown in Fig. 4 these inclinations are reversed, the surface of the disk C inclining upwardly from the center. The exact angle of inclination of the surfaces of the disks C and H, I prefer, however, to form slightly different, so that the two faces incline slightly toward each other. Thus when the disk H is moved toward the disk C its edge $h$ will come in contact therewith immediately within the lip F, while the other parts of the surfaces are out of contact one with the other. The collar G is movable upon the pipe B, so as to move the edge $h$ of the disk H to and from the surface of the disk C. By this means the depth of the film of liquor allowed to flow between the disks H and C may be regulated. By means of a weight I, or other equivalent device, the collar G and its disk H is moved toward the disk C.

J is a chain or cord connecting the collar G with a lever K, whereby the collar G and disk H may be adjusted to and from the disk C.

I prefer to construct the upper surface of the disk C with a series of grooves c, extending out from the center, for the better guiding of the liquor, and to form the rim or lip F with a series of grooves f, which I prefer to form curved, the curvature being in the direction opposite to the direction of the rotation of the disk C. I also prefer to form these grooves at a sharp acute angle, as shown in Fig. 5. This particular construction of the grooves f gives to the lip of the disk a better purchase upon the liquor, and thereby tends to increase the centrifugal force of the throwing power of the rotating disk.

Between the grooves c and f I prefer to leave an ungrooved surface C'', forming a smooth annular ring between the two sets of grooves c and f. It is adjacent to this ungrooved ring C' that the rim of the disk H is arranged, so that it may be moved in contact therewith, forming a valve to control the depth of the film of liquor allowed to flow between the two parts, and, when desired, to completely shut off the supply. The pipe B may be provided with a valve L, for shutting off the supply of liquor from the main A, when desired.

While I prefer the details of construction which have been here shown and described, it is apparent that they may be modified in many ways without departing from the spirit of my invention.

The operation of the apparatus is as follows: The hot liquor to be cooled is allowed to flow from the main A into the supply-pipe B, whence it flows out upon the disk C, under the disk H. The flowing of the liquor upon the surface of the disk C is assisted by the grooves c and the centrifugal force due to the rapid rotation of the disk, the liquor passes under the edge h of the disk H out upon the rim or lip F, whence it is thrown off by centrifugal force in a fine spray, and falls to the pan or receptacle placed to receive it. As the liquor falls through the air in a finely-divided condition it is cooled, and upon reaching the pan is materially reduced in temperature. As heretofore stated, the peculiarly-formed grooves f upon the lip F assist in throwing the liquor, and the angularity of the lip F regulates the angle at which the liquor leaves the disk, and thus the direction and duration of its passage through the air. If the spray is too heavy or the liquor is not separated into sufficiently fine particles the disk H may be adjusted toward the disk C, thus decreasing the depth of the film of liquor and consequently rendering the spray more minute.

While I have described the part C as a disk, it will be understood that my invention, when broadly considered, is not necessarily limited to the employment of an exact disk shape for the rapidly-rotating part by which the liquor is received and sprayed.

Having now described my invention, what I claim as new, and desire to secure by Letters Patent, is—

1. In an apparatus for atomizing and cooling hot liquids, the combination of a supply-pipe for supplying the hot liquor with a rapidly and positively rotated disk or frame having an inclined surface terminating in an annular lip inclined at an angle to the inclined surface, arranged adjacent to the opening of said supply-pipe, to receive the liquor therefrom and throw it outward by centrifugal force.

2. The combination, in an apparatus for atomizing and cooling hot liquids, of a liquor-supply pipe and a rapidly and positively rotating disk arranged adjacent thereto having an inclined annular lip upon its outer edge, said lip being provided with a series of curved transverse grooves, the curvature of which is in a direction opposite to the direction of the rotation of the disk.

3. In an apparatus for atomizing and cooling hot liquids, the combination of a pipe to supply liquor, a rapidly and positively rotated disk or frame arranged adjacent thereto, to receive the liquor from said pipe and throw it outward by the action of the centrifugal force due to the rotation of the disk, and a second disk or frame movable to or from the surface of the first frame to regulate the depth of the film of the liquor allowed to flow thereon.

4. In an apparatus for atomizing and cooling hot liquids, the combination of a pipe to supply liquor, a rapidly and positively rotated disk or frame arranged adjacent thereto, to receive the liquor from said pipe and throw it outward by the action of the centrifugal force due to the rotation of the disk, and a second disk or frame movable to or from the surface of the first frame to regulate the depth of the film of the liquor allowed to flow thereon, the adjacent surfaces of said disks or frames inclining slightly toward each other.

5. In an apparatus for atomizing and cooling liquids, the combination, with a liquor-supply pipe, of a disk arranged adjacent thereto and adapted to receive the liquor therefrom, having an inclined surface, means to positively and rapidly rotate said disk, and a second disk located over the surface of said rotating disk, which receives the liquor, and adjustable to and from it, substantially as and for the purpose described.

6. In an apparatus for atomizing and cooling liquors, the combination, with a supply-pipe B for supplying the hot liquor, of a rotary disk C, arranged adjacent to the supply-pipe, having an inclined surface provided with the grooves c, and a rim F, provided with the grooves f, the intermediate space C' between the grooves c and f being unprovided with grooves, and the movable disk H, extending out over the surface of the disk C, movable upon the supply-pipe B, and having its edge $h$ arranged immediately above the ungrooved annular ring C' and adapted to be adjusted toward said ring C', substantially as and for the purpose specified.

7. In an apparatus for cooling hot liquors, the combination, with a liquor-supply pipe, of a rapidly and positively rotated disk or frame arranged adjacent thereto to receive the liquor from said supply-pipe and to throw it outwardly by centrifugal force, and a second disk or frame having its edge arranged adjacent to said rotatable frame to form a narrow opening for the liquor between said frames, one of said frames being movable to and from the other to adjust the width of said opening.

8. In an apparatus for cooling hot liquors, the combination of two disks or frames arranged adjacent to each other and forming a narrow opening between their adjacent surfaces, means to impart a rapid and positive rotation to one of said disks or frames, and a liquor-supply pipe opening between said frames to admit the liquor, whereby the liquor from said pipe may flow through the opening between said frames and is thrown outwardly by the centrifugal force due to the rotation of the rotatable frame.

In testimony of which invention I have hereunto set my hand.

J. J. DE KINDER.

Witnesses:
R. M. HUNTER,
GEO. W. REED.